United States Patent [19]

Hokama et al.

[11] 3,989,658
[45] Nov. 2, 1976

[54] HOT MELT RESINOUS COMPOSITION COMPRISING A PRIMARY RESIN, A WAX AND A TERPOLYMER OF STYRENE, ISOBUTYLENE AND BETA-PINENE

[75] Inventors: Takeo Hokama, Chicago, Ill.; Frank Scardiglia, Woodcliff Lake, N.J.

[73] Assignee: Velsicol Chemical Corporation, Chicago, Ill.

[22] Filed: Feb. 25, 1976

[21] Appl. No.: 661,080

Related U.S. Application Data

[62] Division of Ser. No. 567,563, April 14, 1975, Pat. No. 3,959,238.

[52] U.S. Cl. ............................ 260/28.5 A; 526/207; 526/226; 526/281
[51] Int. Cl.² ........................................ C08L 91/06
[58] Field of Search ............... 526/281; 260/28.5 A, 260/28.5 AV

[56] References Cited
UNITED STATES PATENTS
3,478,002  11/1969  Nakaguchi ..................... 260/80.78

*Primary Examiner*—Harry Wong, Jr.
*Attorney, Agent, or Firm*—Robert J. Schwarz; Dietmar H. Olesch

[57] ABSTRACT

This invention discloses a hot melt resinous composition comprising a primary resin, a wax and a solid, homogeneous and essentially random terpolymers of styrene, isobutylene and beta-pinene having a number average molecular weight of from about 1500 to about 7000, a styrene content of from about 40 to about 60 weight percent, an isobutylene content of from about 10 to about 40 weight percent, a beta-pinene content of from about 10 to about 40 weight percent and a ring and ball softening point of from about 160° to about 240° F.

5 Claims, No Drawings

HOT MELT RESINOUS COMPOSITION COMPRISING A PRIMARY RESIN, A WAX AND A TERPOLYMER OF STYRENE, ISOBUTYLENE AND BETA-PINENE

This application is a division of copending application Ser. No. 567,563, filed Apr. 14, 1975, and now U.S. Pat. No. 3,959,238.

This invention relates to new terpolymers, to preparational methods therefor and to novel resinous compositions containing such terpolymers. More particularly, this invention relates to homogeneous random low molecular weight terpolymers of styrene, isobutylene and beta-pinene.

The polymerization of styrene with other monomers to form both copolymers and terpolymers is well known. The preparational methods used during polymerization are determinative of the class of polymer obtained. Thus, typically in cationic polymerizations, low polymerization temperatures are employed to prepare high molecular weight polymers whereas high preparational temperatures are used to obtain low molecular weight polymers. The low molecular weight polymers, i.e. those having a number average molecular weight below 20,000, are often used in hot melt coating as well as hot melt adhesive applications. In such applications the polymers are typically combined with microcrystalline or paraffin waxes. However, it has been found that polymers containing large proportions of styrene exhibit incompatibility with hydrocarbon waxes.

It has now been found that certain terpolymers of styrene, isobutylene and beta-pinene possess highly desirable properties including improved compatibility with both paraffin and microcrystalline waxes and are therefore particularly useful in hot melt coatings and adhesives. More specifically, the present invention resides in a solid, homogeneous and essentially random terpolymer of styrene, isobutylene and beta-pinene having a number average molecular weight of from about 1500 to 7000, a styrene content of from about 40 to about 60 weight percent, an isobutylene content of from about 10 to about 40 weight percent, a beta-pinene content of from about 10 to 40 weight percent and a ring and ball softening point of from about 160° F to about 240° F.

The terpolymers of this invention, as indicated, are characterized by a high degree of randomness, that is, the terpolymers consist essentially of basic repeating units of the following formula:

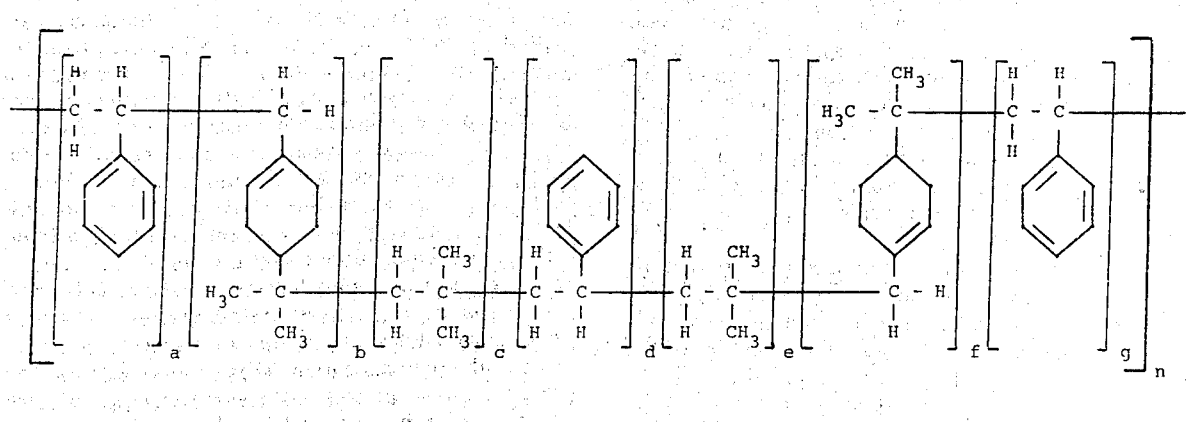

wherein $a$, $b$, $c$, $d$, $e$, $f$ and $g$ are integers from 0 to 10 provided that at least one of $a$, $d$ and $g$, at least one of $b$ and $f$ and at least one of $c$ and $e$ is greater than zero; and provided that $104(a+b+g) + 136(b+f) + 56(c+e)$ does not exceed the numerical value of about 7000; and $n$ is a number ranging from about $\dfrac{1500}{104(a+d+g) + 136(b+f) + 56(c+e)}$ to about $\dfrac{7000}{104(a+d+g) + 136(b+f) + 56(c+e)}$.

It can be seen that in the foregoing quotients the values 104, 136 and 56 represent the molecular weight of the styrene, beta-pinene and isobutylene radicals respectively. Thus the terpolymers of this invention do not contain long sequences of styrene, isobutylene or beta-pinene units. This distinguishes the polymers of the present invention from block-type polymers which essentially contain long sequences of the individual monomer units along the molecular chain. It also distinguishes the polymers from graft-type polymers where repeating units of one monomer are attached to a backbone chain of another. Furthermore the polymers of the present invention do not contain long sequences of alternating monomer units.

In addition to indicating the random nature of the polymers of this invention the above formula also illustrates the specific nature of the terpolymers in that there are substantially no ring alkylated styrene or beta-pinene residues in the polymer arising from an in situ alkylation of the styrene or beta-pinene by the isobutylene. As further illustrated by the structural formula above, the polymerization of the isobutylene unit takes place in such a manner that there are two methyl groups and not only one perpendicular to the molecular chain.

The molecular weight of the terpolymers of this invention in contradistinction to other typical polymers containing styrene is rather low and moreover must be within a limited range in order that the terpolymers possess the desired set of properties. Generally the polymers of this invention have a number average molecular weight ranging from about 1500 to about 7000.

In a preferred embodiment of this invention, however, the terpolymers have a molecular weight ranging from about 2000 to about 4500. As used herein molecular weight is described both in terms of the weight average molecular weight $\overline{M}_w$, and the number average molecular weight $\overline{M}_n$. However, unless specified to the contrary, when used herein and in the appended claims molecular weight will mean the number average molecular weight $\overline{M}_n$. The significance of these conventional molecular weight terms as well as methods for their determination are more fully described in *Structure of Polymers*, M. I. Miller, Reinhold, New York, 1966.

The terpolymers of styrene, isobutylene and beta-pinene of this invention are solid materials having relatively high heat softening points. As measured by the ring and ball method, the heat softening point of the terpolymers ranges from about 160° F to about 240° F. A more limited range of from about 175° F to about 230° F is preferred, however, for maximizing the usefulness of the terpolymers in such applications as components of resinous compositions used for hot melt coatings or adhesives. A further characterizing property of the terpolymers of this invention is that they have good thermal stability and are stable against decomposition to a temperature of 480° F. Accordingly these polymers can be suitably employed in applications without decomposition where high temperatures are likely to exist or occur. This is particularly important in such polymer uses as hot melt coatings and hot melt adhesives which are subjected to elevated temperatures during their application. The particular softening point of the terpolymers is partially dependent on the individual monomer concentration of such polymer. The softening point is particularly a function of the isobutylene content of each terpolymer. Higher softening points are obtained from polymers with lower isobutylene contents and lower softening points are obtained with higher isobutylene contents.

While the terpolymers of this invention are defined by reference to their composition and to the above characterizing properties such as molecular weight, softening point and randomness, such properties are interrelated to the specific method of preparation. Accordingly in preparing the terpolymers of this invention a specific preparational method should be utilized in order that all of the above described properties be obtained. Utilization of such methods not only permits the obtainment of the desired terpolymers but in addition achieves such result with almost theoretical conversions and in a particular convenient and desirable industrial manner. This preparational method involves an interrelated combination of processing features which basically comprise an elevated polymerization temperature, a particular catalyst system and a certain mode of conducting the polymerization reaction. This method is effected, in general, by gradually bringing the styrene, isobutylene and beta-pinene into reactive contact, in the presence of a hydrocarbon polymerization solvent, with a catalyst system of a primary catalyst and a cocatalyst while maintaining a particular polymerization temperature.

The catalyst system which is utilized in preparing the terpolymers of this invention is composed of a primary catalyst and a cocatalyst which are maintained in a specific relative proportion. Both the selection of the primary catalyst and the cocatalyst and their relative proportions in the catalyst system are important to the success of producing high yields of terpolymers having all of the ultimately desired properties. The primary catalyst can consist of at least one alkyl aluminum dihalide wherein the alkyl group contains from 1 to about 5 carbon atoms, including such groups as methyl, ethyl, propyl, butyl, isobutyl and isopentyl. The halide portion can be a halogen atom such as chlorine and bromine. Thus, exemplary primary catalysts are methyl aluminum dichloride, ethyl aluminum dichloride, propyl aluminum dichloride, n-butyl aluminum dichloride, isobutyl aluminum dichloride, pentyl aluminum dichloride, methyl aluminum dibromide, ethyl aluminum dibromide, propyl aluminum dibromide and the like. The preferred primary catalyst for preparing the terpolymers of the present invention is ethyl aluminum dichloride.

The cocatalyst utilized in combination with the primary catalyst in the catalyst system comprises at least one material selected from the group consisting of water, an alkyl halide, a hydrogen halide or an alcohol. Examples of these cocatalysts include alcohols such as alkanols having from 1 to about 5 carbon atoms in the alkyl portion of the molecule such as ethyl alcohol, propyl alcohol, t-butyl alcohol or mixtures thereof; secondary or tertiary alkyl halides where the alkyl portion contains from 3 to 5 carbon atoms such as propyl chloride, butyl chloride and pentyl chloride; or a hydrogen halide such as hydrogen chloride or hydrogen bromide. Of the various catalysts which can be employed an alkanol such as tertiary butyl alcohol or an alkyl halide such as tertiary butyl chloride and especially water are preferred particularly when used in combination with the preferred primary catalyst, ethyl aluminum dichloride. Thus, the most preferred catalyst system is ethyl aluminum dichloride in combination with water.

The relative proportion or ratio of the cocatalyst to catalyst in the catalyst system is important in preparing the terpolymers of the present invention having the desired set of properties. While the ratio can vary depending upon such factors as the particular catalyst and cocatalyst used it should be maintained within certain limits to obtain the desired terpolymers. Generally, the cocatalyst should be present in the catalyst system within a range of from about 2 to 30 mole percent based upon the mole percent of the primary catalyst present. A more limited range of from about 3 to 15 or about 5 to 10 is preferred for such cocatalysts as water particularly when used with the preferred primary catalyst ethyl aluminum dichloride.

The quantity of the primary catalyst used in the catalyst system which in turn determines the quantity of cocatalyst can also be varied. The particular amount used is dependent upon such factors as the particular primary catalyst, the cocatalyst and the polymerization temperature. Generally the quantity of the primary catalyst can range from about 0.20 to about 1.5 weight percent based upon the combined weight of the styrene, isobutylene and beta-pinene monomers. A more limited range of about 0.3 to about 1.0 is preferred, however, when employing catalyst systems containing ethyl aluminum dichloride in combination with cocatalysts such as water, alkyl halides or alkanols.

In preparing the catalyst system the cocatalyst and the primary catalyst can be admixed in the desired ratio prior to the polymerization. More preferably it can be prepared in the presence of the solvent just prior to polymerization by simply adding the appropriate quantities of catalyst and cocatalyst to the solvent with mixing. The primary catalyst itself can also be prepared in situ during or just prior to the polymerization by combining the necessary materials to form the desired alkyl aluminum dihalide. For example aluminum chloride can be admixed with diethyl aluminum chloride in the appropriate proportion to form the active preferred ethyl aluminum dichloride catalyst in situ. It is preferred, however, to add the primary catalyst as a relatively pure compound to the solvent used as the polymerization medium together with the cocatalyst just prior to polymerization.

The temperature utilized in effecting the polymerization is, as previously indicated, higher than normally utilized for the cationic copolymerization of styrene with other monomers. Utilization of such high temperatures in combination with the catalyst system as well as with the mode of conducting the polymerization permits the attainment of the unique terpolymers of this invention. Moreover, employment of this elevated temperature allows the polymerization to be conducted in a highly convenient and industrially desirable manner. The polymerization temperature can range from about 10° C to about 50° C with the specific temperature utilized within this range being dependent upon such factors as the catalyst system employed, the solvent and the ultimately desired properties of the terpolymers. Usually a more limited temperature range of from about 25° C to about 45° C and particularly from about 30° C to about 35° C is preferred.

The hydrocarbon solvent used to effect the polymerization can include a wide class of hydrocarbon polymerization solvents. The particular solvent employed in the polymerization will affect the ultimate properties of the terpolymer produced. Accordingly, it is important to select a solvent or combination of solvents which provides a terpolymer having the desired properties. The solvents which can be used individually or in combination include aliphatics such as alkanes having from 5 to about 10 carbon atoms such as hexane or heptane and aromatics such as benzene or alkylated benzenes such as toluene, xylene or ethylbenzene. Of the various solvents which can be used the preferred solvents are hexane, heptane or mixtures thereof, with the most preferred solvent being hexane. The quantity of solvent employed can be varied but there should at least be a quantity of solvent present sufficient to provide a readily stirrable reaction mixture. Typically when using solvents such as hexane a desirable amount ranges from about 0.5 to about 2.0 weight parts or preferably equal weight parts of solvent per one weight part of the combined styrene, isobutylene and beta-pinene charge.

In carrying out the preparation of the terpolymers of the present invention another processing feature is the particular mode used to bring the monomer charge into reactive contact with the catalyst system. It is important that the styrene, isobutylene and beta-pinene mixture be gradually contacted with the catalyst system in the presence of the solvent if the desired properties in the polymers are to be achieved. This contacting is preferably effected by gradually adding the monomer mixture to the solvent containing the catalyst system while maintaining the desired polymerization temperature. In gradually adding the styrene, isobutylene and beta-pinene, preferably admixed in a single feed stream, the time required to complete the addition will vary depending upon such factors as the particular catalyst system, the polymerization temperature utilized and to a lesser extent the scale of the reaction. Generally, however, the styrene, isobutylene and beta-pinene should be added at a rate adjusted so that they are substantially completely polymerized upon contact with the catalyst system leaving no unreacted monomer in the reaction mixture. Typically, this addition time can range from about 0.1 to about 2 hours with addition times of from about 0.5 to about 1.5 hours being preferred. The charge stream of monomers can contain from about 40 to about 60 weight percent styrene, from about 10 to about 40 weight percent isobutylene and from about 10 to about 40 weight percent beta-pinene depending upon the compositional makeup desired in the final polymer.

The polymerization method for preparing the polymers of this invention can be conducted in a batch, semi-batch or continuous operation. A batch operation is usually suitable, however, and one exemplary procedure involves gradually adding a single stream of styrene, isobutylene and beta-pinene monomers, admixed in the desired weight ratio, to the stirred solvent containing the appropriate catalyst system. The gradual addition of the monomers is adjusted so that substantially all of the styrene, isobutylene and beta-pinene are polymerized upon contact with the catalyst system leaving substantially no unreacted monomer in the reaction mixture. During the addition, the temperature of the exothermic reaction is maintained within the desired range by utilizing appropriate cooling means. When the addition of the monomers is complete, the terpolymer produced can then, if desired, be recovered from the reaction mixture. It is generally desirable, however, to leave the polymer in the reaction mixture in the presence of the catalyst system at the polymerization temperature for a residence period sufficient to insure total, uniform polymerization. The length of this residence time can range from only a few minutes to 1 hour or more. Typically residence periods ranging from 0.25 to about 2 hours are used. After the terpolymer has been in contact with the catalyst system for a sufficient residence period it can be removed from the reaction mixture and purified according to several different procedures. Advantageously, the removal procedure involves first eliminating the catalyst system from the reaction mixture. This can be carried out by first deactivating the catalyst with the addition of methanol to the reaction mixture followed by a neutralization of the catalyst with base such as calcium hydroxide. The reaction mixture can then be filtered to remove the catalyst and neutralizing base. After the catalyst system has been eliminated, the solvent and any impurities formed in the polymerization can be readily removed from the reaction mixture by distillation at reduced pressure leaving the desired terpolymer in high yield.

The terpolymers of this invention and the manner in which they can be prepared is more specifically illustrated in the following example wherein the preparation of a series of terpolymers is detailed.

EXAMPLE 1

A series of terpolymers in accordance with the present invention were prepared by the following procedure:

A monomer charge was prepared by first charging styrene, dried in a molecular sieve column, and beta-pinene, dried by distillation under reduced pressure, into a steel cylinder which was dried by vacuum pumping. The cylinder was cooled in a dry ice bath and isobutylene monomer was added as a liquid in slight excess to the steel cylinder. The monomer charge was adjusted to the proper weight ratio by venting off the excess isobutylene and the cylinder was pressurized with nitrogen gas to a pressure of about 200 p.s.i.g. Oven baked polymerization equipment consisting of a 1 liter 3-necked flask equipped with a gas inlet tube, a mechanical stirrer, a thermometer and a dry ice condenser was cooled to room temperature under a flow of dry nitrogen gas. Hexane, dried by passage through a molecular sieve column, was then charged into the flask. The hexane solvent was degassed by slowly bubbling nitrogen gas through the gas inlet tube for a period of about 30 minutes. Water cocatalyst was added to the flask and the mixture was stirred for a period of about 15 minutes. Ethyl aluminum dichloride catalyst (25 weight percent in hexane) was then added and the resulting mixture was aged for a period of about 15 minutes. A small amount of the monomer charge was introduced into the flask and the mixture was aged for a period of about 15 minutes. After this time the remaining monomer charge was added to the flask through the gas inlet tube with vigorous stirring over a period ranging from about 15 to about 45 minutes. The reaction temperature during this time was maintained within the desired range by intermittent cooling with a dry ice acetone bath. After the addition was completed stirring was continued to ensure completion of the reaction. The catalyst system was then deactivated by the addition of methanol (10 ml) and neutralized through the addition of calcium hydroxide (13 grams). The reaction mixture was then suction filtered through a sintered glass funnel containing a bed of diatomaceous earth. The filter bed was washed with toluene to ensure complete transfer of polymer. The filtrate was then concentrated by distillation at ambient pressure to a temperature of 200° C and was then stripped of remaining volatile components at a temperature of 225° C and at a pressure of 0.35 mm of mercury to yield the desired terpolymer.

The polymerization conditions employed in the preparation of a series of terpolymers of this invention are summarized in Table I and the properties of these polymers are summarized in Table II.

In Table II the molecular weights reported were determined using Vapor Pressure Osmometry techniques. The heat softening point was obtained by the Ring and Ball method of ASTM E 28-67. The iodine number was determined using ASTM method D 1959-6.1.

TABLE I

| Polymer No. | Styrene/ Isobutylene/ β-Pinene Monomer Wt. Ratio | Primary Catalyst Wt. % Based on Combined Monomer Weight | Cocatalyst ($H_2O$) Mole % Based On Primary Catalyst | Polymerization Temperature ° C | Addition Time (Min.) | Residence Time (Min.) | Yield Percent |
|---|---|---|---|---|---|---|---|
| 1 | 50/20/30 | 1.0 | 20 | 20–25 | 15 | 240 | 96.4 |
| 2 | 50/20/30 | 1.0 | 20 | 20–25 | 15 | 120 | 96.3 |
| 3 | 50/20/30 | 1.0 | 20 | 20–25 | 15 | 60 | 94.5 |
| 4 | 50/20/30 | 1.0 | 20 | 20–25 | 15 | 30 | 96.0 |
| 5 | 50/20/30 | 1.0 | 20 | 20–25 | 15 | 15 | 88.3 |
| 6 | 50/20/30 | 1.0 | 20 | 20–25 | 15 | 0 | 89.3 |
| 7 | 50/20/30 | 2.0 | 20 | 20–25 | 15 | 45 | 96.0 |
| 8 | 50/20/30 | 1.0 | 20 | 20–25 | 15 | 45 | 95.5 |
| 9 | 50/20/30 | 0.5 | 20 | 20–25 | 15 | 45 | 97.1 |
| 10 | 50/20/30 | 0.25 | 20 | 20–25 | 15 | 45 | 93.1 |
| 11 | 50/20/30 | 1.0 | 20 | 30–35 | 15 | 45 | 94.2 |
| 12 | 50/20/30 | 1.0 | 20 | 5–10 | 15 | 45 | 95.7 |
| 13 | 50/20/30 | 0.5 | 20 | 30–35 | 15 | 45 | 95.7 |
| 14 | 50/20/30 | 0.5 | 20 | 5–10 | 15 | 45 | 93.4 |
| 15 | 50/20/30 | 0.5 | 10 | 20–25 | 15 | 45 | 94.9 |
| 16 | 50/20/30 | 0.5 | 5 | 20–25 | 15 | 45 | 95.1 |
| 17 | 50/20/30 | 0.38 | 5 | 20–25 | 45 | 15 | 95.5 |
| 18 | 50/20/30 | 0.5 | 5 | 20–25 | 45 | 15 | 94.1 |
| 19 | 50/20/30 | 1.0 | 20 | 20–25 | 15 | 120 | 94.7 |
| 20 | 50/20/30 | 0.5 | 5 | 20–25 | 15 | 45 | 94.0 |
| 21 | 50/30/20 | 1.0 | 20 | 20–25 | 15 | 60 | 95.9 |
| 22 | 50/30/20 | 0.5 | 5 | 20–25 | 15 | 45 | 93.0 |
| 23 | 50/30/20 | 0.5 | 5 | 20–25 | 15 | 45 | 90.2 |
| 24 | 50/30/20 | 0.5 | 5 | 30–35 | 45 | 15 | 93.4 |
| 25 | 50/20/30 | 0.5 | 5 | 30–35 | 45 | 15 | 94.3 |
| 26 | 50/10/40 | 0.5 | 5 | 30–35 | 45 | 15 | 94.8 |
| 27 | 50/20/30 | 1.0 | 20 | 20–25 | 15 | 120 | 94.3 |
| 28 | 50/30/20 | 1.0 | 20 | 20–25 | 15 | 120 | 94.7 |
| 29 | 50/10/40 | 1.0 | 20 | 20–25 | 15 | 120 | 94.4 |

TABLE II

POLYMER PROPERTIES

| Polymer No. | Number Average Molecular Wt. | Softening Point °F | Gardner Viscosity 70 % Solids in Toluene | Gardner Color 50 % Solids in Toluene | Iodine Number |
|---|---|---|---|---|---|
| 1 | 2419 | 209 | $Z_1$ to $Z_2$ | <1 | 75 |
| 2 | 2689 | 208 | >$Z_6$ | <1 | 74 |
| 3 | 2639 | 210 | >$Z_6$ | <1 | 71 |
| 4 | 2717 | 213 | U to V | <1 | 79 |
| 5 | 2350 | 210 | Y to Z | <1 | 81 |
| 6 | 2532 | 219 | I to J | <1 | 77 |
| 7 | 2600 | 208 | V to W | <1 | 80 |
| 8 | 2403 | 209 | $Z_4$ | <1 | 79 |
| 9 | 2878 | 211 | $Z_6$ | <1 | 74 |
| 10 | 3169 | 215 | Y | <1 | 79 |
| 11 | 2331 | 207 | Z to $Z_1$ | <1 | 80 |

TABLE II-continued

POLYMER PROPERTIES

| Polymer No. | Number Average Molecular Wt. | Softening Point °F | Gardner Viscosity 70 % Solids in Toluene | Gardner Color 50 % Solids in Toluene | Iodine Number |
|---|---|---|---|---|---|
| 12 | 3158 | 220 | Z | <1 | 78 |
| 13 | 2519 | 205 | V to W | <1 | 80 |
| 14 | 3290 | 221 | Z to $Z_1$ | <1 | 80 |
| 15 | 3073 | 216 | M | <1 | 81 |
| 16 | — | 218 | $Z_3$ | <1 | 80 |
| 17 | 3120 | 219 | S | <1 | — |
| 18 | 4820 | 218 | — | <1 | 83 |
| 19 | 2331 | 213 | M | <1 | 78 |
| 20 | 4500 | 228 | V | <1 | 81 |
| 21 | 2444 | 189 | <A | <1 | 56 |
| 22 | 3480 | 201 | Q | <1 | 59 |
| 23 | 4510 | 203 | V | <1 | 61 |
| 27 | 2940 | 209 | — | <1 | 78 |
| 28 | 2662 | 185 | — | <1 | 55 |
| 29 | 2570 | 230 | Y to Z | <1 | 113 |

To demonstrate the random nature of the terpolymers of the present invention as well as their homogeneity, samples of polymers Nos. 20 and 22 were fractionated as follows:

To a five percent solution of the polymer in benzene, methanol was added dropwise until an opalescent solution was obtained. The precipitated polymer was allowed to settle and the supernatant liquid was decanted. The precipitated polymer was washed with methanol and dried. The methanol solution was added dropwise to the decanted supernatant solution to obtain another opalescent solution. Repeated precipitation and isolation of resin samples from solvent mixtures containing increased methanol concentrations were carried out to give the results set forth in Table III for the two polymers of this invention. This data demonstrates both the random nature as well as the compositional homogeneity of the terpolymers of this invention.

TABLE III

ANALYSIS OF TERPOLYMERS AND THEIR FRACTIONS

| | Fraction of Sample Wt. % | % Styrene | % Iso-butylene | % β-Pinene | Number Average Molecular Weight |
|---|---|---|---|---|---|
| Polymer No. 20 | 100.0 | 52.7 | 12.8 | 34.5 | 4,500 |
| Fraction 1 | 19.9 | 51.7 | 6.3 | 42.0 | 18,560 |
| Fraction 2 | 26.9 | 53.4 | 8.6 | 38.0 | 4,475 |
| Fraction 3 | 18.9 | 54.2 | 12.3 | 33.5 | 4,080 |
| Fraction 4 | 34.3 | 50.6 | 19.9 | 29.5 | 2,770 |
| Polymer No. 22 | 100.0 | 53.5 | 22.0 | 24.5 | 3,480 |
| Fraction 1 | 20.4 | 53.7 | 19.3 | 27.0 | 3,350 |
| Fraction 2 | 27.2 | 53.3 | 22.7 | 24.0 | 3,140 |
| Fraction 3 | 21.0 | 54.5 | 22.5 | 23.0 | 3,200 |
| Fraction 4 | 31.4 | 49.0 | 27.5 | 23.5 | 2,290 |

The terpolymers of the present invention must be prepared from the beta isomer of pinene to the substantial exclusion of alpha-pinene. Whereas the utilization of the beta isomer of pinene produces polymer in high yield, i.e. greater than 90 percent, provided the reaction conditions set forth above are utilized, the utilization of alpha-pinene or even mixtures of alpha- and beta-pinene result in catalyst poisoning and low yields. To demonstrate the criticalness of utilizing beta-pinene in the terpolymers of this invention experiments were carried out wherein varying amounts of beta-pinene were substituted with alpha-pinene in the preparation of terpolymers. In each instance low yields of polymer were obtained. The preparational conditions and yields of polymer obtained in these experiments is set forth in Table IV.

TABLE IV

| | POLYMER NO. | | | |
|---|---|---|---|---|
| | 30 | 31 | 32 | 33 |
| Styrene/Iso-butylene/β-Pinene/α-Pinene Monomer Wt. Ratio | 50/20/27/3 | 50/20/24/6 | 50/20/15/15 | 50/20/0/30 |
| Primary Catalyst Wt. % Based on Combined Monomer Weight Ratio | 0.5 | 0.5 | 0.5 | 0.5 |
| Cocatalyst ($H_2O$) Mole % Based on Primary Catalyst | 5 | 5 | 5 | 5 |
| Polymerization Temperature °C | 20–25 | 20–25 | 20–25 | 20–25 |

TABLE IV-continued

| | POLYMER NO. | | | |
|---|---|---|---|---|
| | 30 | 31 | 32 | 33 |
| Addition Time (Minutes) | 15 | 15 | 15 | 15 |
| Residence Time (Minutes) | 45 | 45 | 45 | 45 |
| Yield Percent | 87.4 | 86.6 | 75.2 | 58.9 |

As previously indicated the terpolymers of styrene, isobutylene and beta-pinene are useful for a variety of different polymeric applications. One especially useful application is utilization of the copolymers as components of resinous compositions used for hot melt resins. These hot melt resinous compositions are typically composed of an admixture of a primary resin component, a wax component, and a modifying resin component which serves to compatibilize and otherwise improve the properties of the primary resin and wax component. These hot melt resin compositions are used primarily in coating and adhesive applications. For example, in coating applications they are used to coat substrates such as cloth, paper or cardboard to provide a moisture and vapor impermeable coating or surface. In adhesive applications these resin compositions are used to bond layers of paper or cardboard to form laminates of such materials which possess great strength as well as being impervious to water or moisture vapors. A particular requirement of these hot melt resinous compositions is that they have a desirable combination of melting points and viscosities or molten viscosity which permits them to be machine applied at high speed to the particular substrates. Aside from such basic properties, however, these resins must, as films or coatings, also have a combination of other suitable properties such as low water vapor transmissivity, strength, elasticity, glossiness, thermal stability, good adhesiveness and hot tack, as well as a good color.

A hot melt resinous composition having a particularly desirable set of these properties is obtained according to this invention by utilizing the instant terpolymers as the modifying resin component of such resinous compositions in combination with the primary resin and the wax component. The primary resin component which can be combined with the wax component and the terpolymers of this invention to form the hot melt resinous compositions can include a wide variety of materials. Generally most of the materials commonly employed as the primary resin component of hot melt resinous compositions can be suitably utilized. Typically, these materials include polyethylenes, polypropylenes, ethylene-vinyl acetate copolymers or various combinations thereof. Usually ethylene-vinyl acetate copolymers are preferred as the primary resin component. Suitable copolymers of ethylene and vinyl acetate which can be employed have a melt index in the range of 2.5 to 550 using the ASTM Procedure D-1238. These copolymers advantageously contain a vinyl acetate monomer content in the range of from about 5 to 45 weight percent and more typically from about 15 to about 42 weight percent.

The wax component which can be compounded with the primary resin component and with the terpolymer of this invention can be selected from a wide group of waxes and wax combinations. Suitable waxes include aliphatic hydrocarbon waxes, for example, paraffin waxes of various melting points ranging from about 120° F to about 165° F; microcrystalline and crystalline waxes having melting points of from about 140° F to about 200° F; natural vegetable waxes, such as carnauba or beeswax; or synthetic waxes such as hydrogenated castor oils or polyethylene oxides. Of the various waxes which can be utilized as the wax component, however, paraffins and microcrystalline waxes are generally preferred. This is especially the case when employed in combination with ethylene-vinyl acetate copolymers as the primary resin, since the paraffins yield better moisture proofing and are generally lighter in color. Frequently, it is desirable to employ the paraffin waxes in combination with the microcrystalline waxes especially when increased adhesiveness is desired. These preferred paraffins have a melting point of from about 145° F to about 165° F.

The particular formulation of the hot melt resinous composition of this invention in respect to the proportions of the primary resin component, the wax component and the styrene, isobutylene and beta-pinene terpolymer can be widely varied. The particular proportions for any formulation are selected depending upon such factors as the intended application. Usually, for most hot melt resin applications, the terpolymer of this invention can constitute from about 10 to about 60 weight percent of the resinous composition. A more limited range of from about 20 to about 40 weight percent is preferred especially when the primary resin is a copolymer of ethylene-vinyl acetate as heretofore described and the wax is a paraffin or microcrystalline wax. The amount of wax component and primary resin component can also be varied. Generally the quantity of primary resin can range from about 10 to about 65 weight percent of the total composition with a range of from about 20 to about 40 weight percent being preferred. The quantity of wax component can range from about 20 to about 80 weight percent with a range of from about 25 to about 65 weight percent being preferred.

Thus a further embodiment of the present invention resides in a hot melt resinous composition comprising from about 10 to about 65 weight percent of a primary resin, from about 20 to about 80 weight percent of a wax and from about 10 to about 60 weight percent of the terpolymer of this invention.

The hot melt resinous compositions can be prepared or formulated by employing conventional resin blending procedures. The procedures typically involve mixing, blending, or milling the components, if necessary under application of heat, in the desired respective proportions to obtain a substantially homogeneous, one phase, or completely dispersed mixture. The hot melt resinous compositions thus prepared can be applied according to standard coating and adhesive techniques to such substrates as cloth, paper or cardboard to form moisture impermeable coatings or laminates of such materials having high strength and water vapor imperviousness.

The hot melt resinous compositions of this invention are more specifically illustrated in the following example.

EXAMPLE 2

The polymers of Example 1 were utilized to prepare hot melt resinous compositions by blending the respective terpolymer with a primary resin and a wax. The primary resin component consisted essentially of an ethylene-vinyl acetate copolymer (Elvax 350, Du Pont) having a vinyl acetate monomer content of about 25 weight percent and a melt index of 17.3 to 20.9 (ASTM D-1238). The wax component consisted essentially of a microcrystalline wax (Mobilwax 2305) having a melting point of about 176° F. One percent by weight of antioxidant was added and the components were blended to form a hot melt resinous composition. The terpolymers of Example 1, the primary resin and the wax component were present in equal parts in all of the compositions.

The cloud point of each of the hot melt resin compositions of Example 2 was determined by heating a sample of each of the compositions in a 16 mm test tube in a forced air oven to a temperature of about 400° F. The samples were then permitted to cool with stirring and the temperature at which the melted composition became hazy was recorded as its cloud point. The results of the procedure are shown in Table V.

TABLE V

| Polymer No. | Composition of Resin Formulation, Weight Percent | | | Cloud Point |
|---|---|---|---|---|
| | Terpolymer | Wax | Primary Resin | |
| 1 | 33 | 33 | 33 | 196 |
| 2 | 33 | 33 | 33 | 197 |
| 3 | 33 | 33 | 33 | 196 |
| 4 | 33 | 33 | 33 | 196 |
| 7 | 33 | 33 | 33 | 199 |
| 8 | 33 | 33 | 33 | 198 |
| 9 | 33 | 33 | 33 | 197 |
| 10 | 33 | 33 | 33 | 228 |
| 11 | 33 | 33 | 33 | 203 |
| 12 | 33 | 33 | 33 | 279 |
| 13 | 33 | 33 | 33 | 195 |
| 14 | 33 | 33 | 33 | 289 |
| 15 | 33 | 33 | 33 | 240 |
| 16 | 33 | 33 | 33 | 207 |
| 17 | 33 | 33 | 33 | 234 |
| 18 | 33 | 33 | 33 | 232 |
| 21 | 33 | 33 | 33 | 199 |
| 24 | 33 | 33 | 33 | 196 |
| 25 | 33 | 33 | 33 | 196 |
| 26 | 33 | 33 | 33 | 196 |
| 28 | 10 | 75* | 15** | 156 |
| 28 | 33 | 50* | 17** | 153 |

*paraffin wax having a melt point of 150° F (ASTM D-87)
**ethylene vinyl acetate copolymer having a vinyl acetate monomer content of 28 % and a melt index of 22 to 28

We claim:
1. A hot melt resinous composition comprising from about 10 to about 65 weight percent of a primary resin, from about 20 to about 80 weight percent of a wax and from about 10 to about 60 weight percent of a solid homogeneous and essentially random terpolymer of styrene, isobutylene and beta-pinene having a number average molecular weight of from about 1500 to about 7000, a styrene content of from about 40 to about 60 weight percent, an isobutylene content of from about 10 to about 40 weight percent, a beta-pinene content of from about 10 to about 40 weight percent and a ring and ball softening point of from about 160° F to about 240° F.

2. The composition of claim 1 wherein the primary resin is selected from the group consisting of polyethylene, polypropylene, ethylene-vinyl acetate copolymers and mixtures thereof.

3. The composition of claim 1 wherein the wax is selected from the group consisting of paraffin wax having a melting point of from about 130° F to about 165° F and microcrystalline wax having a melt point of from about 165° F to about 200° F.

4. The composition of claim 1 wherein the primary resin is selected from the group consisting of polyethylene, polypropylene, ethylene-vinyl acetate copolymers and mixtures thereof and wherein the wax is selected from the group consisting of paraffin wax having a melting point of from about 130° F to about 165° F and microcrystalline wax having a melt point of from about 165° F to about 200° F.

5. The composition of claim 4 wherein the primary resin is an ethylene-vinyl acetate copolymer having a melt index of from 2.5 to 550.

* * * * *